US006241212B1

(12) United States Patent
Takahashi et al.

(10) Patent No.: US 6,241,212 B1
(45) Date of Patent: Jun. 5, 2001

(54) HOSE RUPTURE CONTROL VALVE UNIT

(75) Inventors: Tarou Takahashi, Kita-ku; Genroku Sugiyama; Tsukasa Toyooka, both of Ibaraki-ken, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/294,431

(22) Filed: Apr. 20, 1999

(30) Foreign Application Priority Data

Apr. 21, 1998 (JP) ............................................... 10-110776

(51) Int. Cl.[7] ............................................... F16K 17/20
(52) U.S. Cl. ............................... 251/44; 251/35; 137/460
(58) Field of Search ......................... 251/44, 35; 137/460

(56) References Cited

U.S. PATENT DOCUMENTS 4,471,797 * 9/1984 Cass et al. ....................... 137/460 X
4,471,806 * 9/1984 Strock ............................. 137/460 X
4,732,190 * 3/1988 Polselli ............................... 137/460
4,779,836 * 10/1988 Marklund .......................... 251/44 X
4,905,959 * 3/1990 Anderson .......................... 251/44 X
5,137,254 * 8/1992 Aardema et al. .................. 251/35 X
5,178,358 * 1/1993 Schelm .............................. 251/44 X
5,645,263 * 7/1997 Aardema ............................ 251/44 X

FOREIGN PATENT DOCUMENTS 3-249411 11/1991 (JP) .
WO98/6949 2/1998 (WO) .

* cited by examiner

*Primary Examiner*—Kevin Shaver
*Assistant Examiner*—John Bastianelli
(74) *Attorney, Agent, or Firm*—Mattingly, Stanger & Malur

(57) ABSTRACT

A hose rupture control valve unit includes a housing provided with two input/output ports. One input/output port is directly attached to a bottom port of a hydraulic cylinder, and the other input/output port is connected to one of actuator ports of a control valve via an actuator line. Within the housing, there are provided a poppet valve body serving as a main valve, a spool valve body serving as a pilot valve which is operated with a pilot pressure supplied as an external signal from a manual pilot valve, thereby operating the poppet valve body, and a small spool having the function of an overload relief valve. The above construction reduces the number of components arranged in a flow passage through which a hydraulic fluid passes at a large flow rate, and hence a pressure loss. A further reduction in overall size and production cost of the valve unit is achieved.

6 Claims, 10 Drawing Sheets

HOSE RUPTURE CONTROL VALVE UNIT

BACKGROUND OF THE INVENTION

1. Field of the Invention

The present invention relates to a hose rupture control valve unit (often called a hose rupture valve) which is provided in a hydraulic machine, such as a hydraulic excavator, for preventing a drop of the load upon rupture of a cylinder hose.

2. Description of the Prior Art

In a hydraulic machine such as a hydraulic excavator, there is a need for preventing a drop of the load even if a hose or steel pipe for supplying a hydraulic fluid to a hydraulic cylinder, serving as an actuator for driving a load, e.g., an arm, should be ruptured. To meet such a need, a hose rupture control valve unit (often called a hose rupture valve) is provided in the hydraulic machine. FIG. 8 is a hydraulic circuit diagram showing a typical conventional hose rupture control valve unit, and FIG. 9 shows a sectional structure of the hose rupture control valve unit.

Referring to FIGS. 8 and 9, a hose rupture control valve unit 200 comprises a housing 204 provided with two input/output ports 201, 202 and a reservoir port 203. The input/output port 201 is directly attached to a bottom port of a hydraulic cylinder 502, the input/output port 202 is connected to one of actuator ports of a control valve 503 via a hydraulic line (hose) 505, and the reservoir port 203 is connected to a reservoir 509 via a drain line (hose) 205. Within the housing 204, there are provided a main spool 211 operated with a pilot pressure supplied as an external signal from a manual pilot valve 508, a check valve 212 for fluid supply, a poppet valve body 214 controlled by a pilot portion 213 which is provided in the circumference of the main spool 211, and an overload relief valve 215 for releasing an abnormal pressure.

In the conventional hose rupture control valve unit 200 having the above-described construction, supply of a hydraulic fluid to the bottom side of the hydraulic cylinder 502 is effected by supplying the hydraulic fluid from the control valve 503 to the bottom side through the fluid-supply check valve 212. Also, discharge of the hydraulic fluid from the bottom side of the hydraulic cylinder 502 is effected by operating the main spool 211 of the valve unit 200 with the pilot pressure as an external signal to first open the poppet valve body 214 controlled by the pilot portion 213 which is provided in the circumference of the main spool 211, and then open a variable throttle portion 211*a* also provided in the circumference of the main spool 211, thereby draining the hydraulic fluid to the reservoir 509 while controlling the flow rate of the hydraulic fluid.

The poppet valve body 214 is provided in series with respect to the main spool 211, and has the function (load check function) of reducing the amount of leakage in a condition of holding the load pressure on the bottom side of the hydraulic cylinder 502.

The overload relief valve 215 operates to drain the hydraulic fluid and prevent hose rupture in the event an excessive external force acts on the hydraulic cylinder 502 and the hydraulic pressure supplied to the bottom side of the hydraulic cylinder 502 is brought into a high-pressure level.

Also, if the hydraulic hose 505 leading from the control valve 503 to the input/output port 202 should be ruptured, the check valve 212 and the poppet valve body 214 are closed to prevent a drop of the load borne by the hydraulic cylinder 502. At this time, by operating the main spool 211 with the pilot pressure from the manual pilot valve 508 and adjusting an opening area of the variable throttle portion 211*a,* it is possible to slowly contract the hydraulic cylinder 502 under action of the weight of the load itself and to move the load to a safety position.

Numerals 507*a* and 507*b* denote main relief valves for limiting a maximum pressure in the circuit.

Further, JP, A, 3-249411 discloses a hose rupture control valve unit utilizing a proportional seat valve to reduce an overall size of the valve unit. FIG. 10 shows the disclosed hose rupture control valve unit.

Referring to FIG. 10, a hose rupture control valve unit 300 comprises a housing 323 provided with an input port 320, a work port 321 and a reservoir port 322. The input port 320 is connected to one of actuator ports of a control valve 503, the work port 321 is connected to a bottom port of a hydraulic cylinder 502, and the reservoir port 322 is connected to a reservoir 509 via a drain line (hose) 205. Within the housing 323, there are provided a check valve 324 for fluid supply, a proportional seat valve 325, an overload relief valve 326, and a pilot valve 340. The pilot valve 340 is operated with a pilot pressure supplied as an external signal from a manual pilot valve 508 (see FIG. 8), and the proportional seat valve 325 is operated with the operation of the pilot valve 340. The overload relief valve 326 is incorporated in the proportional seat valve 325.

Supply of a hydraulic fluid to the bottom side of the hydraulic cylinder 502 is effected by supplying the hydraulic fluid from the control valve 503 to the bottom side through the fluid-supply check valve 324 of the valve unit 300. Also, discharge of the hydraulic fluid from the bottom side of the hydraulic cylinder 502 is effected by operating the pilot valve 340 of the valve unit 300 with the pilot pressure, as an external signal, to open the proportional seat valve 325, thereby draining the hydraulic fluid to the reservoir 509 while controlling the flow rate of the hydraulic fluid. The proportional seat valve 325 has the function (load check function) of reducing the amount of leakage in a condition of holding the load pressure on the bottom side of the hydraulic cylinder 502.

The overload relief valve 326 operates to open the proportional seat valve 325 for draining the hydraulic fluid and preventing hose rupture in the event an excessive external force acts on the hydraulic cylinder 502 and the hydraulic pressure supplied to the bottom side of the hydraulic cylinder 502 is brought into a high-pressure level.

Also, if a hydraulic line (hose) 505 leading from the control valve 503 to the input port 320 should be ruptured, the check valve 324 and the proportional seat valve 325 are closed to prevent a drop of the load borne by the hydraulic cylinder 502. At this time, by operating a spool 341 of the pilot valve 340 with the pilot pressure and adjusting an opening area of the proportional seat valve 325, it is possible to slowly contract the hydraulic cylinder 502 under action of the weight of the load itself and to move the load to a safety position.

SUMMARY OF THE INVENTION

In the conventional hose rupture control valve unit shown in FIGS. 8 and 9, various components, i.e., the check valve 212 for fluid supply, the main spool 211, the poppet valve body 214 controlled by the pilot portion 213 provided in the circumference of the main spool 211, and the overload relief valve 215, are separately provided corresponding to the respective functions. Therefore, incorporating all those components in the housing 204 of a restricted certain size imposes a limitation in sizes of the individual components. Also, there has been a difficulty in reducing the production cost.

On the other hand, since all of the hydraulic fluid discharged from the hydraulic cylinder 502 passes through the main spool 211, a spool valve body of the main spool 211 is required to have a larger diameter. Further, because of the main spool 211 and the poppet valve body 214 being provided in series, the hydraulic fluid passes through these two valve elements at a large flow rate. However, when the main spool 211 and the poppet valve body 214 are incorporated besides the other components in the housing 204 of the restricted certain size, their sizes are necessarily limited. This may result in that a sufficient flow passage is not ensured and a pressure loss is increased. In addition, a pressure loss is also inevitable with such a construction that the hydraulic fluid passes at a large flow rate through the main spool 211 and the poppet valve body 214 provided in series.

The hose rupture control valve unit is mounted to the bottom side of a boom cylinder or the rod side of an arm cylinder. A boom and an arm, to which the boom cylinder and the arm cylinder are attached, are each a working member operated to be able to rotate in the vertical direction. If the size of the housing 204 is selected to a relatively large value in consideration of the problem of a pressure loss, a risk would be increased that the hose rupture control valve unit is damaged upon hitting against rocks, etc. during the operation of the boom or the arm. It has been thus difficult to design the hose rupture control valve unit in appropriate size.

Further, since all of the hydraulic fluid discharged from the hydraulic cylinder 502 passes through the overload relief valve 215 as well, the overload relief valve 215 is also required to have a rather large size. Correspondingly, the drain hose 205 leading to the reservoir port 203 is likewise required to have a rather large inner diameter. These requirements result in an increase of the production cost and a difficulty in routing the drain hose compactly.

FIG. 11 is a simplified diagram showing the case where the hose rupture control valve unit is attached to each of two boom cylinders. Referring to FIG. 11, symbols 502*a*, 502*b* denote two boom cylinders. Rod ends of the boom cylinders 502*a*, 502*b* are rotatably coupled through pins 230*a*, 230*b* to both sides of a boom 232 bearing a load 231. Hose rupture control valve units 200*a*, 200*b*, each being the same as the above-mentioned valve unit 200, are mounted respectively to the bottom sides of the boom cylinders 502*a*, 502*b*. In such an arrangement for practical use, during the operation with main spools 211 of the valve units 200*a*, 200*b* being open, bending loads would impose on the pins 230*a*, 230*b* due to a difference between driving forces acting on the pins 230*a*, 230*b*, thus causing breakage of the pins 230*a*, 230*b*, if there is a difference between metering characteristics of the main spools 211 due to a variation in machining carried out on the main spools 211. For that reason, the main spools 211 of the valve units 200*a*, 200*b* are required to have the metering characteristics as identical as possible to each other.

In the hose rupture control valve unit disclosed in JP, A, 3-249411, shown in FIG. 10, the overload relief valve 326 is incorporated in the proportional seat valve 325, which is controlled by the pilot valve 340, so that the proportional seat valve 325 has not only the function of the main spool 211 in the above-described prior art, but also the functions of the poppet valve body 214 and the overload relief valve 215. Therefore, the number of components is reduced as compared with that needed in the above-described prior art, and a reduction in size of the valve unit can be achieved to some extent while lessening a pressure loss. With this disclosed prior art, however, the check valve 324 for fluid supply is still an essential component. In other words, there is a demand for a further improvement in reducing the size of the valve unit and cutting down the production cost.

Also, although the overload relief valve 326 is incorporated in the proportional seat valve 325 to provide the proportional seat valve 325 with the overload relief function, the point that all of the hydraulic fluid discharged from the hydraulic cylinder 502 passes through the reservoir port 322 and returns to the reservoir 509 via the drain hose 205 is the same as in the above-described prior art shown in FIGS. 8 and 9. As a result, the drain hose 205 is required to have a rather large inner diameter, and a difficulty is encountered in routing the drain hose compactly.

Further, when the hose rupture control valve unit is mounted for each boom cylinder as shown in FIG. 11, the disclosed prior art also requires that metering characteristics of the valve units, each including the proportional seat valve 325 and the pilot valve 340, on both sides are as identical as possible to each other like the above-described prior art shown in FIGS. 8 and 9. For the valve unit shown in FIG. 10, particularly, because the metering characteristics require to be made identical in consideration of variations in machining carried out on both the proportional seat valve 325 and the pilot valve 340, adjustment of the metering characteristics becomes very difficult.

A first object of the present invention is to provide a hose rupture control valve unit which can reduce a pressure loss, an entire size of the valve unit, and a production cost while ensuring the various functions that are the least necessary as the hose rupture control valve unit.

A second object of the present invention is to provide a hose rupture control valve unit which requires no drain hose specific to an overload relief valve, and hence which can further reduce a production cost of the valve unit and simplify routing of hoses around the valve unit.

A third object of the present invention is to provide a hose rupture control valve unit with which, even when two hose rupture control valve units are arranged in parallel as encountered in application to boom cylinders, metering characteristics of the two valve units can be adjusted with good accuracy.

(1) To achieve the above objects, according to the present invention, in a hose rupture control valve unit provided between a supply/drain port of a hydraulic cylinder and a hydraulic hose for controlling a flow rate of a hydraulic fluid coming out from the supply/drain port to the hydraulic hose in accordance with an external signal, the valve unit comprises a poppet valve body serving as a main valve slidably disposed in a housing provided with a cylinder connecting chamber connected to the supply/drain port, a hose connecting chamber connected to the hydraulic hose, and a back pressure chamber, the poppet valve body being able to selectively interrupt and establish communication between the cylinder connecting chamber and the hose connecting chamber, and changing an opening area depending on the amount of movement thereof, and a spool valve body serving as a pilot valve disposed in a pilot passage connecting the back pressure chamber and the hose connecting chamber, and operated in accordance with the external signal to interrupt and control a rate of pilot flow passing through the pilot passage depending on the amount of movement thereof, the poppet valve body being provided with a feedback variable throttle passage which has an initial opening area when the poppet valve body is in a interrupting position, and increases an opening area thereof depending on the amount of movement of the poppet valve body, thereby controlling a value of the rate of pilot flow coming out from the cylinder connecting chamber to the back pressure.

In operation of supplying the hydraulic fluid to the bottom side of the hydraulic cylinder, since the feedback variable throttle passage has the initial opening area, the poppet valve body is opened when a pressure in the hose connecting chamber rises to a level higher than a load pressure, allowing the hydraulic fluid to be supplied to the bottom side of the hydraulic cylinder (conventional check valve function on the supply side).

In operation of discharging the hydraulic fluid from the bottom side of the hydraulic cylinder, when the spool valve body is operated in accordance with the external signal and the pilot flow is produced at a rate depending on the amount of movement of the spool valve body, the poppet valve body is opened and the amount of movement thereof is controlled depending on the rate of the pilot flow. Therefore, most of the hydraulic fluid on the bottom side of the hydraulic cylinder passes through the poppet valve body, whereas the remaining hydraulic fluid passes through the feedback variable throttle passage, the back pressure chamber and the spool valve body, both the flows of the hydraulic fluid being then drained to the reservoir (conventional main spool function).

In operation of holding the load pressure on the bottom side of the hydraulic cylinder, the poppet valve body is in the interrupting position and holds the load pressure, thereby reducing the amount of leakage (load check function).

Thus the hose rupture control valve unit of the present invention can fulfill the conventional check valve function on the supply side, main spool function, and load check function. Further, the poppet valve body is only one component arranged in a flow passage through which the hydraulic fluid passes at a large flow rate, and hence a pressure loss is reduced. In addition, it is possible to reduce an overall size and production cost of the valve unit.

(2) In the above (1), preferably, the valve unit further comprises communicating means for communicating the back pressure chamber with the reservoir when a pressure in the hose connecting chamber exceeds a preset value.

In the event an excessive external force acts on the hydraulic cylinder, the pressure in the cylinder connecting chamber rises, causing the communicating means to communicate the back pressure chamber with the reservoir, whereupon the pressure in the back pressure chamber lowers and the poppet valve body is opened. The hydraulic fluid, that is brought into a high-pressure level under action of the external force, is drained to the reservoir through a main overload relief valve which is disposed in an actuator line as conventional.

Thus, since the function of an overload relief valve is realized and the hydraulic fluid passes through the communicating means at a small flow rate, a size of the communicating means can be reduced. In addition, since the hydraulic fluid is released from the communicating means to the reservoir via a drain line that is identical to the drain line formed in the conventional valve unit, a drain hose specific to the overload relief valve is no longer required in the valve unit, and routing of the hose around the valve unit can be simplified.

(3) In the above (2), preferably, the communicating means is provided in parallel to the spool valve body.

(4) Also, in the above (2), the communicating means comprises a relief valve provided in parallel to the spool valve body, pressure generating means provided downstream of the relief valve, and means for causing a pressure generated by the pressure generating means to act as a driving force on the spool valve body on the same side as the external signal.

In the event an excessive force acts on the hydraulic cylinder and the pressure in the back pressure chamber rises, the relief valve is opened, whereupon a pressure generated by the pressure generating means operates the spool valve body. The operation of the spool valve body produces the pilot flow and opens the poppet valve body. As a result, the hydraulic fluid in the hydraulic cylinder can be released to the reservoir through the main overload relief valve in a similar manner as described in the above (2). Furthermore, the same function as that of the communicating means in the above (2) can be realized by the relief valve through which the hydraulic fluid passes at a smaller flow rate than through the communicating means in the above (2). Hence the component size can be reduced and the overall size of the valve unit can be further reduced.

(5) In the above (1), preferably, the poppet valve body has a dead zone set to maintain the poppet valve body in the interrupting position when the rate of pilot flow is not larger than a predetermined value.

According to this feature, even with two hose rupture control valve units arranged in parallel as encountered when attached to boom cylinders, metering characteristics of the two valve units can be adjusted with good accuracy by adjusting metering characteristics of only spool valve bodies in the range where poppet valve bodies are each in the dead zone.

(6) In the above (1), preferably, the spool valve body includes adjusting means capable of changing the amount of movement of the spool valve body with respect to the external signal.

According to this feature, the accuracy of metering characteristic of the spool valve body itself can be further improved.

DETAILED DESCRIPTION OF THE PREFERRED EMBODIMENTS

Preferred embodiments of the present invention will be described below with reference to the drawings.

Figure 1:
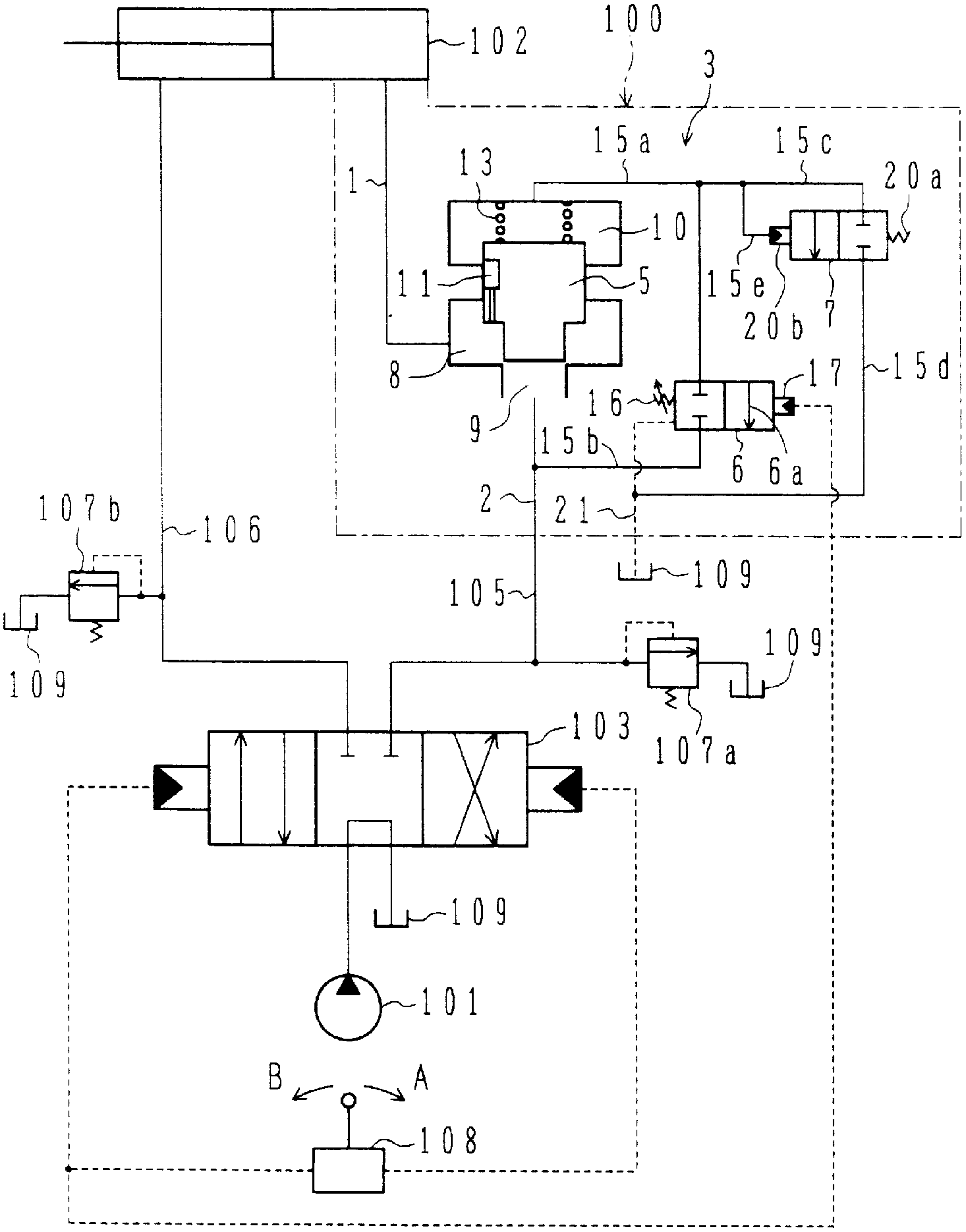
FIG. 1 is a hydraulic circuit diagram showing a hose rupture control valve unit according to one embodiment of the present invention, along with a hydraulic drive system in which the valve unit is disposed.
Figure 2:
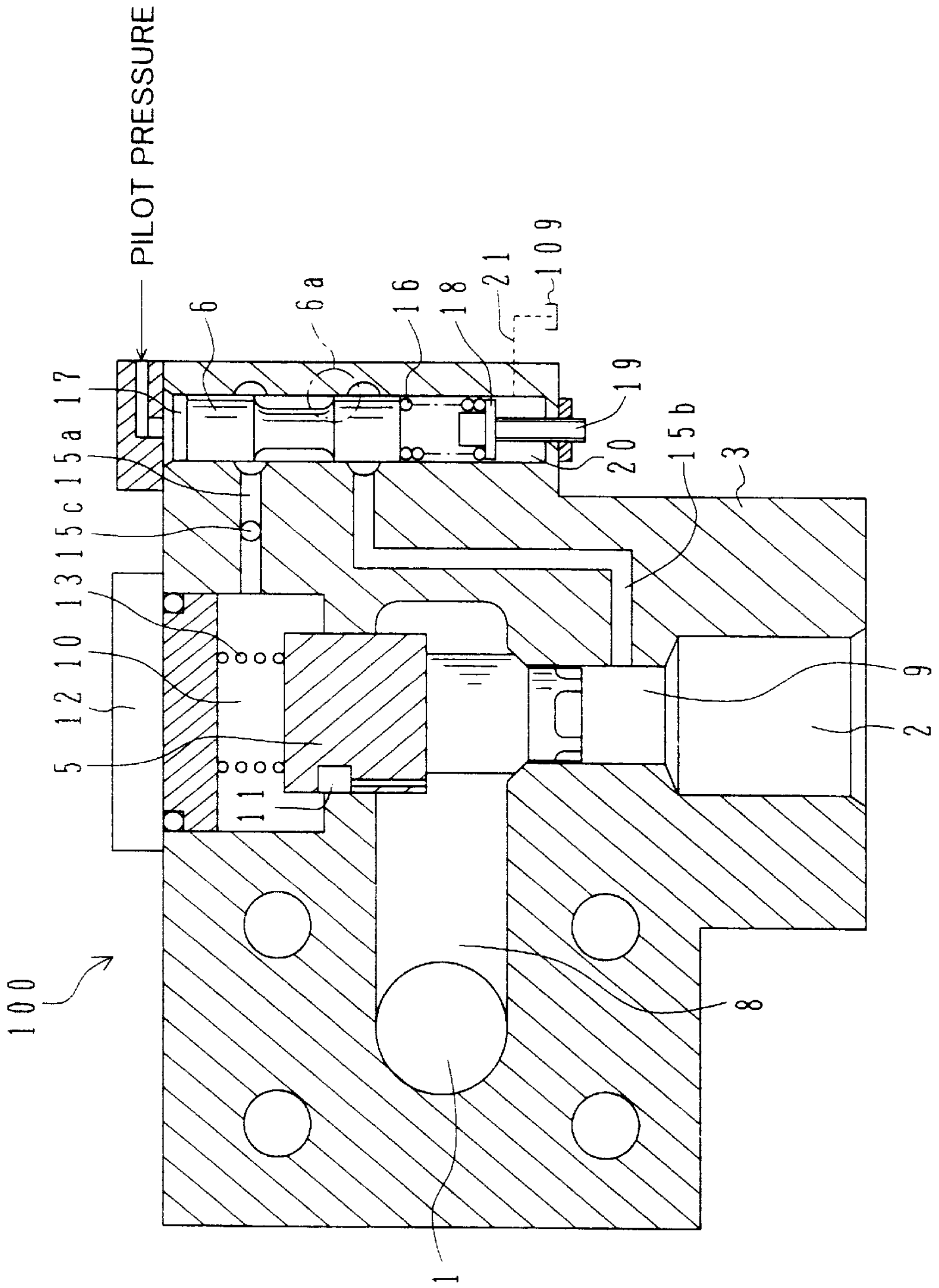
FIG. 2 is a sectional view showing the structure of a portion, i.e., a poppet valve body and a spool valve body, of the hose rupture control valve unit shown in FIG. 1.
Figure 3:
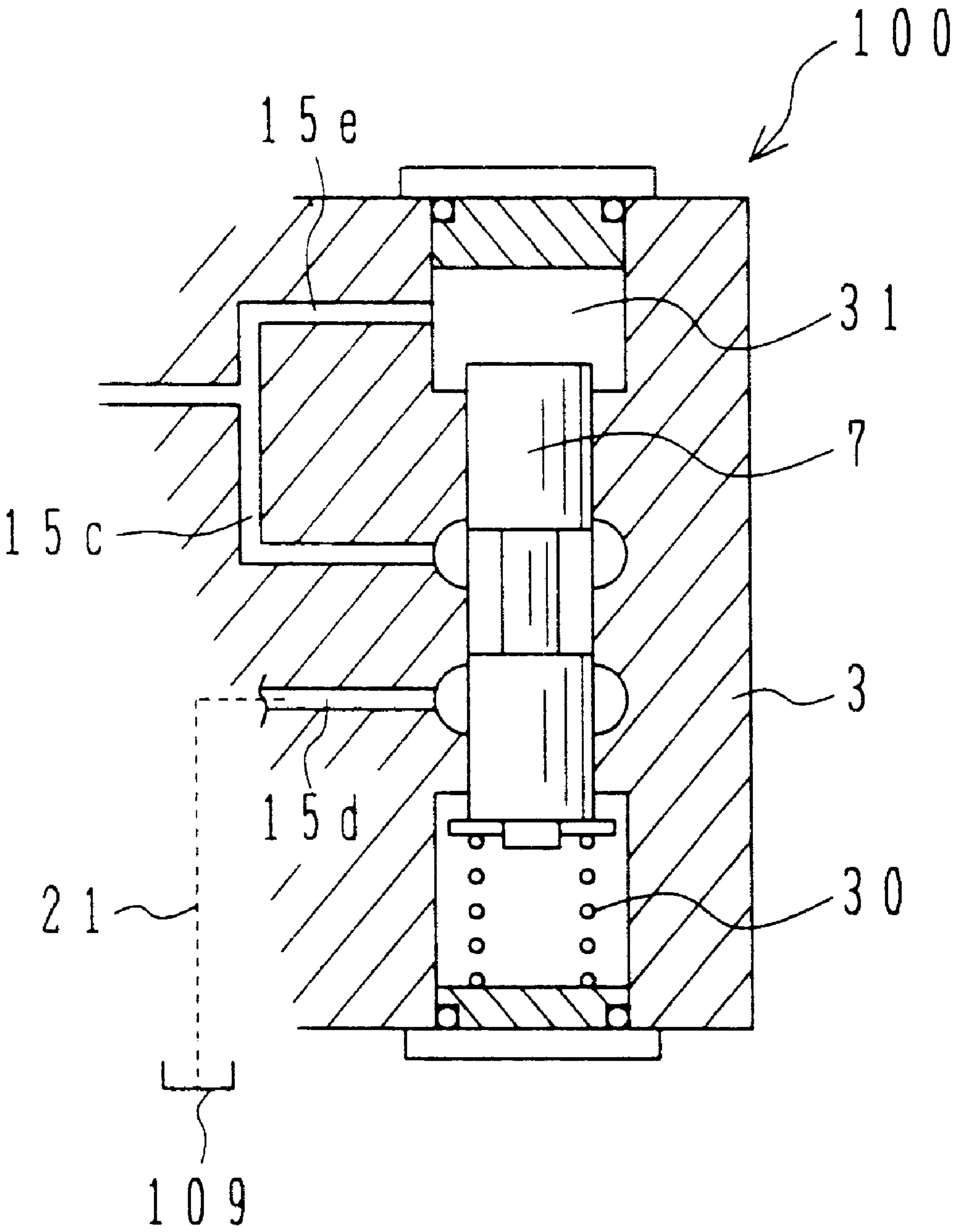
FIG. 3 is a sectional view showing the structure of another portion, i.e., a small spool, of the hose rupture control valve unit shown in FIG. 1.

FIG. 1 is a hydraulic circuit diagram showing a hose rupture control valve unit according to one embodiment of the present invention, and FIGS. 2 and 3 are sectional views each showing a structure of the hose rupture control valve unit.

Referring to FIG. 1, numeral 100 denotes a hose rupture control valve unit of this embodiment. A hydraulic drive system, in which the valve unit 100 is disposed, comprises a hydraulic pump 101, a hydraulic actuator (hydraulic cylinder) 102 driven by a hydraulic fluid delivered from the hydraulic pump 101, a control valve 103 for controlling a flow of the hydraulic fluid supplied from the hydraulic pump 101 to the hydraulic cylinder 102, main overload relief valves 107*a*, 107*b* connected to actuator lines 105, 106, which are hydraulic lines (hoses) extended from the control valve 103, for limiting a maximum pressure in the illustrated circuit, a manual pilot valve 108, and a reservoir 109.

As shown in FIGS. 1 and 2, the hose rupture control valve unit 100 comprises a housing 3 provided with two input/output ports 1 and 2. The input/output port 1 is directly attached to a bottom port of a hydraulic cylinder 102, and the input/output port 2 is connected two actuator ports of the control valve 103 via the actuator line 105. Within the housing 3, there are provided a poppet valve body 5 serving as a main valve, a spool valve body 6 serving as a pilot valve which is operated with a pilot pressure supplied as an external signal from the manual pilot valve 108, thereby operating the poppet valve body 5, and a small spool 7 serving as communicating means which has the function of an overload relief valve.

Further, within the housing 3, there are defined a cylinder connecting chamber 8 connected to the input/-output port 1, a hose connecting chamber 9 connected to the hydraulic hose constituting the actuator line 105, and a back pressure chamber 10. The poppet valve body 5 serving as a main valve is slidably disposed in the housing 3 such that it is subjected at its back surface to a pressure in the back pressure chamber 10, and it selectively interrupts and establishes communication between the cylinder connecting chamber 8 and the hose connecting chamber 9 while its opening area is changed depending on the amount of movement (stroke) thereof. The poppet valve body 5 is provided with a feedback slit 11 serving as a feedback variable throttle passage which increases its opening area depending on the amount of movement of the poppet valve body 5 and controls a rate of pilot flow coming out from the cylinder connecting chamber 8 to the back pressure chamber 10 depending on the opening area thereof. The back pressure chamber 10 is closed by a plug 12 (see FIG. 2), and a spring 13 is disposed in the back pressure chamber 10 for holding the poppet valve body 5 in the interrupting position as shown.

Pilot passages 15*a*, 15*b* are formed in the housing 3 to connect the back pressure chamber 10 and the hose connecting chamber 9, and the spool valve body 6 serving as a pilot valve is disposed between the pilot passages 15*a*, 15*b*. The spool valve body 6 has a pilot variable throttle 6*a* capable of communicating the pilot passages 15*a*, 15*b* with each other. A spring 16 for setting an initial valve-opening force of the pilot variable throttle 6*a* is disposed at an operating end of the spool valve 6 in the valve-closing direction, and a pressure bearing chamber 17, to which the pilot pressure is introduced as an external signal, is formed at an operating end of the spool valve 6 in the valve-opening direction. The amount of movement of the spool valve body 6 is determined by a control force given by the pilot pressure (external signal) introduced to the pressure bearing chamber 17 and an urging force produced by the spring 16. The rate of pilot flow passing through the pilot passages 15*a*, 15*b* is interrupted and controlled depending on the amount of movement of the spool valve body 6. The spring 16 is supported by a spring receiver 18 provided with a threaded portion 19 which enables an initial setting force of the spring (i.e., the initial valve-opening force of the pilot variable throttle 6*a*) to be adjusted. A spring chamber 20, in which the spring 16 is disposed, is connected to the reservoir via a drain line 21 so that the spool valve body 6 smoothly moves in the spring chamber 20.

The small spool 7 serving as communicating means, which has the function of an overload relief valve, is constructed to selectively open and close communication between a pilot passage 15*c* and a drain passage 15*d*, as shown in FIG. 3. The pilot passage 15*c* is connected to the pilot passage 15*a*, and the drain passage 15*d* is connected to the drain line 21. A spring 30 for setting a relief pressure is disposed at an operating end of the small spool 7 in the valve-closing direction, and a pressure bearing chamber 31, to which a pressure in the pilot passage 15*c* is introduced via a pilot passage 15*e*, is formed at an operating end of the small spool 7 in the valve-opening direction. When the pressure in the pilot passage 15*c* exceeds the relief pressure set by the spring 30, the pilot passage 15*c* is communicated with the reservoir.

The relationships of an opening area of the poppet valve body 5 and an opening area of the feedback slit 11 with respect to the amount of movement (stroke) of the poppet valve body 5, and the relationships of a rate of fluid flow passing through the spool valve body 6 (pilot flow rate) and a rate of fluid flow passing through the poppet valve body 5 (main flow rate) with respect to the external signal (pilot pressure) will now be described.

Figure 4:
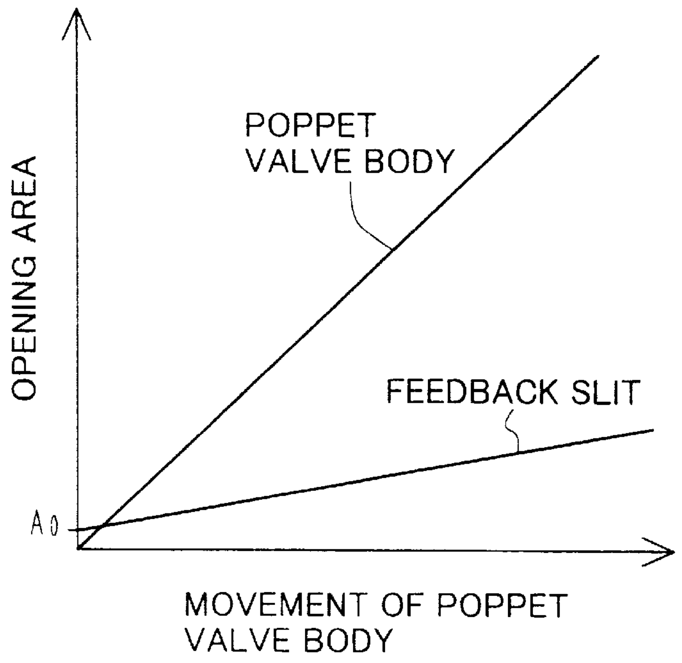
FIG. 4 is a graph showing the relationships of an opening area of the poppet valve body and an opening area of a feedback slit with respect to the amount of movement (stroke) of the poppet valve body.

FIG. 4 is a graph showing the relationships of an opening area of the poppet valve body 5 and an opening area of the feedback slit 11 with respect to the amount of movement (stroke) of the poppet valve body 5. When the poppet valve body 5 is in the interrupting position, the feedback slit 11 has a predetermined initial opening area $A_0$. As the poppet valve body 5 starts moving from the interrupting position and the amount of movement thereof increases, the opening areas of the poppet valve body 5 and the feedback slit 11 are increased proportionally. Because of the feedback slit 11 having the predetermined initial opening area $A_0$, the poppet valve body 5 can perform not only the function of the conventional check valve for fluid supply, but also the function of the overload relief valve in cooperation with the small spool 7 (described later).

Figure 5:
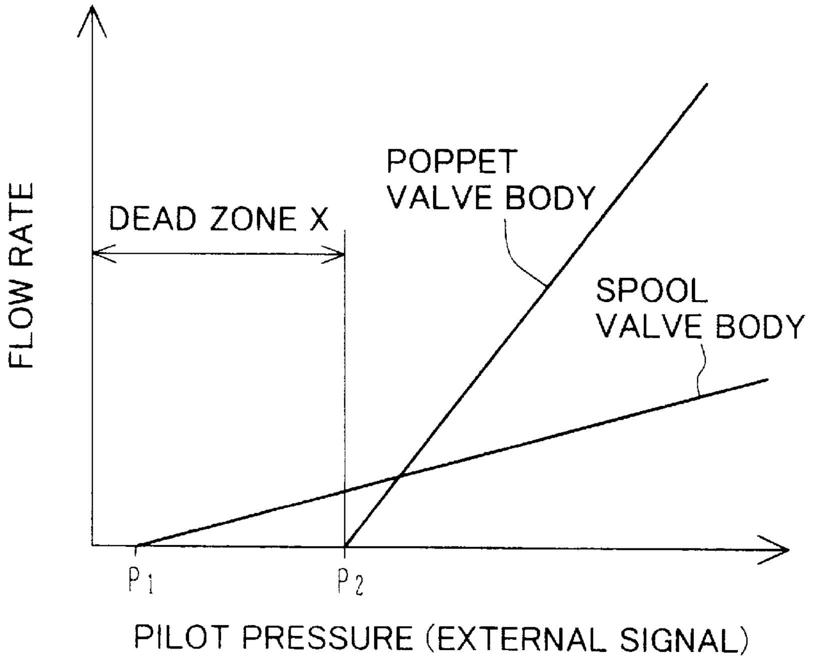
FIG. 5 is a graph showing the relationships of a rate of fluid flow passing through the spool valve body (pilot flow rate) and a rate of fluid flow passing through the poppet valve body (main flow rate) with respect to an external signal (pilot pressure).

FIG. 5 is a graph showing the relationships of a rate of fluid flow passing through the spool valve body 6 (spool flow rate) and a rate of fluid flow passing through the poppet valve body 5 (main flow rate) with respect to the external signal (pilot pressure). The range of the pilot pressure from 0 to $P_1$ corresponds to a dead zone X of the spool valve body 6. Even with the pilot pressure rising in that range, the spool valve body 6 is held stopped by the initial setting force of the spring 16 or, even if moved, it is kept in an overlap region before reaching the valve-opening position. The pilot variable throttle 6*a* of the spool valve body 6 therefore remains in the interrupting position. The pilot variable throttle 6*a* starts opening when the pilot pressure reaches $P_1$, and the opening area of the pilot variable throttle 6*a* increases as the pilot pressure rises over $P_1$. Correspondingly, the rate of fluid flow passing through the spool valve body 6, i.e., the spool flow rate, also increases. The dead zone X of the poppet valve body 5 continues until the pilot pressure reaches $P_2$ ($>P_1$). During the dead zone X, a pressure fall occurred in the back pressure chamber 10 is insufficient due to the presence of the feedback slit 11 even with the pilot flow rate produced to some extent, and therefore the poppet valve body 5 is held in the interrupting position by the initial setting force of the spring 13. The poppet valve body 5 starts opening when the pilot pressure reaches $P_2$, and the opening area of the poppet valve body 5 increases as the pilot pressure rises over $P_2$. Correspondingly, the rate of fluid flow passing through the poppet valve body 5, i.e., the main flow rate, also increases. A value of the pilot pressure $P_2$ can be adjusted by a value of the pilot pressure $P_1$, and the value of the pilot pressure $P_1$ can be adjusted by turning the threaded portion 19 of the spool valve body 6 to adjust the stiffness (initial setting force) of the spring 16.

By thus providing the dead zone X for the poppet valve body 5, flow rate control in the initial low range before reaching the pilot pressure $P_2$ is carried out by the spool valve body 6 only, and an opening characteristic of the valve unit in such a range can be adjusted with good accuracy. In addition, since the spring 16 associated with the spool valve body 6 is adjustable in stiffness to make the value of the pilot pressure $P_2$ adjustable, the accuracy in adjustment can be further improved.

Next, the operation of the hose rupture control valve unit 100 thus constructed will be described.

1) Operation of Supplying Hydraulic Fluid to Bottom Side of Hydraulic Cylinder 102

When a control lever of the manual pilot valve 108 is operated in the direction A denoted in FIG. 1 to shift the control valve 103 to take a right-hand position as viewed in the drawing, the hydraulic fluid from the hydraulic pump 101 is supplied to the hose connecting chamber 9 of the valve unit 100 through the control valve 103, causing the pressure in the hose connecting chamber 9 to rise. At this time, since the pressure in the cylinder connecting chamber 8 of the valve unit 100 is equal to the load pressure on the bottom side of the hydraulic cylinder 102 and the feedback slit 11 has the initial opening area $A_0$, the pressure in the back pressure chamber 10 is also equal to the load pressure. Accordingly, while the pressure in the hose connecting chamber 9 is lower than the load pressure, the poppet valve body 5 is held in the interrupting position. As soon as the pressure in the hose connecting chamber 9 becomes higher than the load pressure, the poppet valve body 5 starts to move upward in the drawing, allowing the hydraulic fluid to flow into the cylinder connecting chamber 8. Thus the hydraulic fluid from the hydraulic pump 101 is supplied to the bottom side of the hydraulic cylinder 102. While the poppet valve body 5 is moving upward, the hydraulic fluid in the back pressure chamber 10 displaces into the cylinder connecting chamber 8 through the feedback slit 11 for ensuring smooth opening of the poppet valve body 5. The hydraulic fluid from the rod side of the hydraulic cylinder 102 is drained to the reservoir 109 through the control valve 103.

2) Operation of Discharging Hydraulic Fluid from Bottom Side of Hydraulic Cylinder 102 to Control Valve 103

When the control lever of the manual pilot valve 108 is operated in the direction B denoted in FIG. 1 to shift the control valve 103 to take a left-hand position as viewed in the drawing, the hydraulic fluid from the hydraulic pump 101 is supplied to the rod side of the hydraulic cylinder 102 through the control valve 103. At the same time, the pilot pressure from the manual pilot valve 108 is introduced to the pressure bearing chamber 17 of the spool valve body 6 to move the spool valve body 6, whereupon the pilot variable throttle 6*a* of the spool valve body 6 has an opening area corresponding to the amount of movement thereof. Accordingly, the hydraulic fluid passes through the pilot passages 15*a*, 15*b* at the pilot flow rate depending on the pilot pressure, and the poppet valve body 5 is opened and controlled in the amount of movement thereof depending on the pilot flow rate. As a result, most of the hydraulic fluid on the bottom side of the hydraulic cylinder 102 passes through the poppet valve body 5 from the cylinder connecting chamber 8 of the valve unit 100, whereas the remaining hydraulic fluid passes through the feedback slit 11, the back pressure chamber 10, the pilot passage 15*a*, the spool valve body 6, and the pilot passage 15*b*. These flows of the hydraulic fluid are led to the control valve 103 while the flow rates are controlled by the poppet valve body 5 and the spool valve body 6, respectively, followed by being drained to the reservoir 109. In this way, the flow rate of the hydraulic fluid discharged from the actuator 102 to the control valve 103 can be controlled.

3) Operation of Holding Load Pressure On Bottom Side of Hydraulic Cylinder 102

In a condition where the load pressure on the bottom side of the hydraulic cylinder 102 becomes high, as occurred in the case of holding a lifted load with the control valve 103 maintained at the neutral position, the poppet valve body 5 in the interrupting position retains the load pressure as with the conventional load check valve, thereby performing the function of reducing the amount of leakage (load check function).

4) Upon Excessive External Force Acting on Hydraulic Cylinder 102

In the event an excessive external force acts on the hydraulic cylinder 102 and the pressure in the cylinder connecting chamber 8 becomes high, the small spool 7 is moved by the hydraulic fluid introduced to a pressure bearing chamber 20*b* of the small spool 7 through the feedback slit 11, the back pressure chamber 10, and the pilot passages 15*a*, 15*e*, whereby the hydraulic pressure in the back pressure chamber 10 is released into the reservoir 109 and the pressure in the back pressure chamber 10 is reduced, causing the poppet valve body 5 to move upward as viewed in the drawing. With the upward movement of the poppet valve body 5, the input/output port 1 and the input/output port 2 are subjected to the same level pressure, and therefore the hydraulic fluid, that is brought into a high-pressure level under action of the external force, is drained to the reservoir 109 through the overload relief valve 107*a* connected to the actuator line 105. As a result, damage of the equipment is prevented. On that occasion, since the hydraulic fluid passes through the small spool 7 at a small flow rate, the function equivalent to that of the conventional overload relief valve can be realized with the small spool 7 having a small size.

Figure 11:
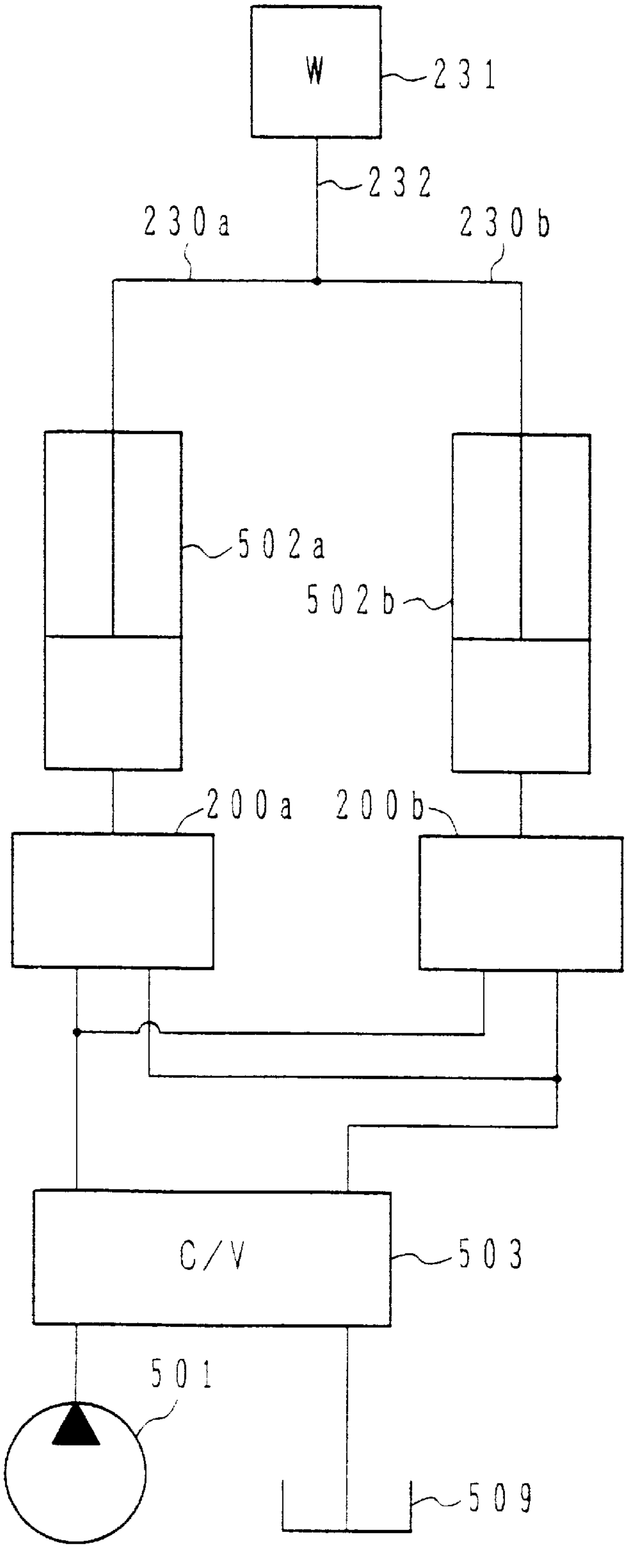
FIG.11 PRIOR ART
FIG. 11 is a simplified diagram showing the case where the hose rupture control valve unit is attached to each boom cylinder.

5) Parallel Arrangement of Valve Units 100 as Encountered When Attached to Boom Cylinders In the valve unit 100 of the present invention, because two valve bodies, i.e., the spool valve body 6 and the poppet valve body 5, are operated, a metering characteristic tends to cause an error due to variations in machining carried out on individual components for each valve unit 100. Particularly, in an example of practical use where two valve units 100 are arranged in parallel corresponding to respective boom cylinders, as described above in connection with FIG. 11, bending loads would impose on the pins 230*a*, 230*b* due to a difference between driving forces caused by a discrepancy in metering characteristic between the left and right valve units 100, thus causing breakage of the pins 230*a*, 230*b*, unless the machining accuracy of individual components of each valve unit is remarkably improved. Taking into account that point, this embodiment sets the dead zone X for the poppet valve body 5 as described above in connection with FIG. 5. With the provision of the dead zone X, in the initial low range before reaching the pilot pressure $P_2$, the poppet valve body 5 remains standstill, and flow rate control in that range is carried out by the spool valve body 6 only. Therefore, a flow rate difference caused by differences in metering characteristic due to variations in machining carried out on the spool valve bodies 6 and the poppet valve bodies 5 of the left and right valve units 100 can be minimized. In addition, since the metering characteristic of the spool valve body 6 is adjustable by adjusting the stiffness of the spring 16 associated with the spool valve body 6, the accuracy of metering characteristic in flow rate control performed by the spool valve body 6 can be further improved.

6) In the Event of Damage of Actuator Line 105

If the actuator line 105 leading from the control valve 103 to the input/output port 2 should be damaged, the poppet valve body 5 is closed and a drop of the load borne by the hydraulic cylinder 102 is prevented. On that occasion, by operating the spool valve body 6 with the pilot pressure from the manual pilot valve 108 and adjusting the opening area of the pilot variable throttle 6*a*, it is possible to slowly contract the hydraulic cylinder 102 under action of the weight of the load itself, and to move the load to a safety position.

With this embodiment, as described above, just by providing the poppet valve body 5 in a flow passage through which all of the hydraulic fluid supplied to and discharged from the hydraulic cylinder 102 passes, the poppet valve body 5 can fulfill the functions of the check valve for fluid supply, the load check valve, and the overload relief valve in the conventional hose rupture control valve unit. Therefore, a valve unit having a small pressure loss can be constructed, and highly efficient operation can be achieved with a less energy loss. Also, since the valve unit 100 has a smaller size than the conventional hose rupture control valve unit, a possibility that the valve unit may be damaged during works is reduced, and a degree of flexibility in design is increased. Further, the reduced number of components contributes to reducing the failure frequency, improving the reliability, and enabling the valve unit to be produced at a relatively low cost.

Moreover, since the hydraulic fluid, that is brought into a high-pressure level under action of an external force, can be released to the reservoir through the main overload relief valve 107*a* upon the poppet valve body 5 being opened, the hydraulic fluid passes through the small spool 7 at a small flow rate, and therefore the function equivalent to the conventional overload relief valve can be realized with the small spool 7 having a small size. In addition, since the hydraulic fluid is released from the small spool 7 to the reservoir via the drain line 21 that is identical to the drain line formed in the conventional valve unit, a drain hose specific to the overload relief valve is no longer required in the valve unit 100, and routing of the hose around the valve unit 100 can be simplified.

Further, even with two hose rupture control valve units arranged in parallel as encountered when attached to boom cylinders, since only the spool valve body 6 is operated when the poppet valve body 5 is in the dead zone X, metering characteristics of the two valve units can be adjusted with good accuracy. Additionally, by adjusting the stiffness of the spring 16 associated with the spool valve body 6, the accuracy of metering characteristic of the spool valve body 6 itself can be further improved.

Figure 6:
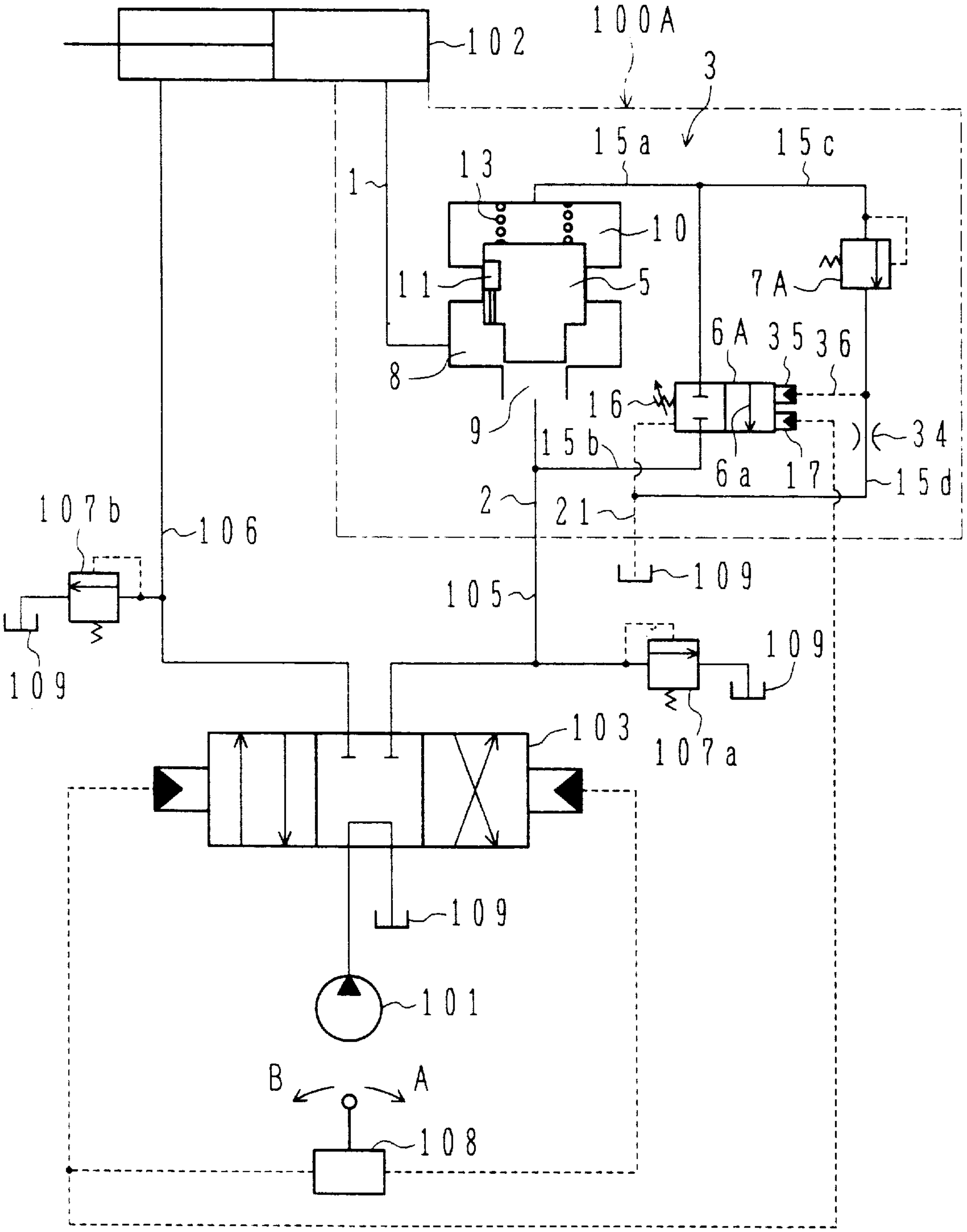
FIG. 6 is a hydraulic circuit diagram showing a hose rupture control valve unit according to another embodiment of the present invention, along with a hydraulic drive system in which the valve unit is disposed.
Figure 7:
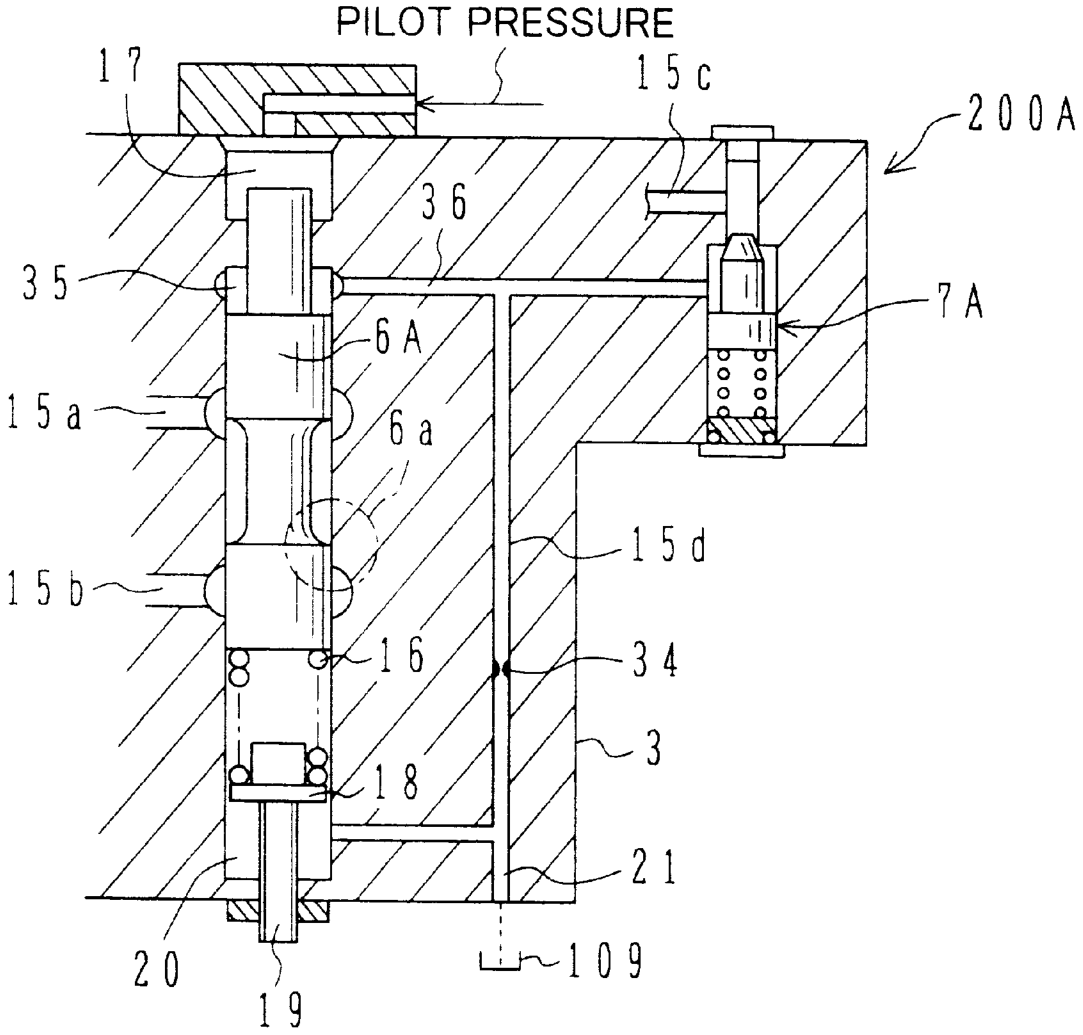
FIG. 7 is a sectional view showing the structure of a portion, i.e., a small relief valve, of the hose rupture control valve unit shown in FIG. 6.
Figure 8:
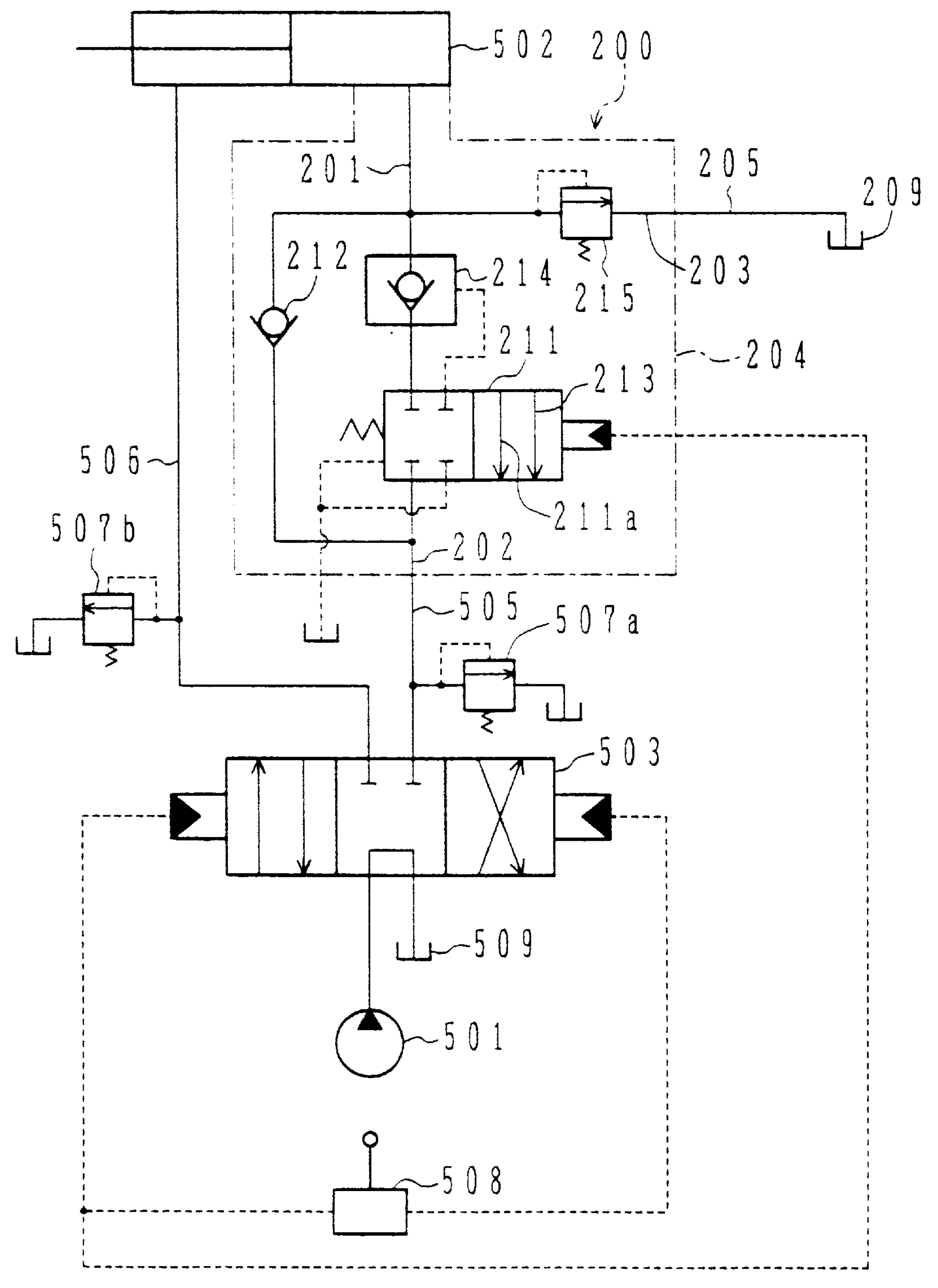
FIG.8 PRIOR ART
FIG. 8 is a hydraulic circuit diagram showing a conventional hose rupture control valve unit, along with a hydraulic drive system in which the valve unit is disposed.
Figure 9:
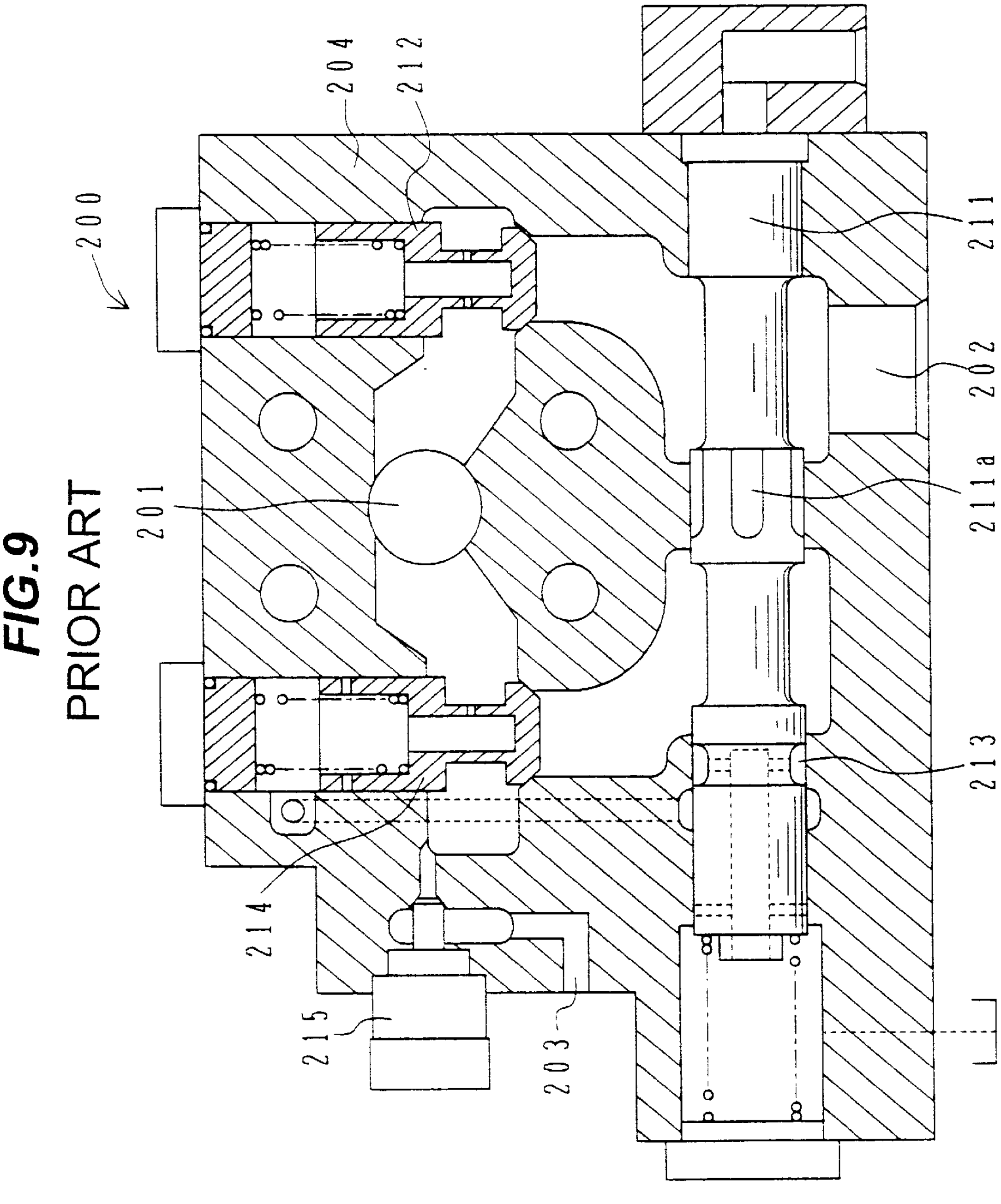
FIG.9 PRIOR ART
FIG. 9 is a sectional view showing the structure of a principal part of the conventional hose rupture control valve unit shown in FIG. 8.
Figure 10:
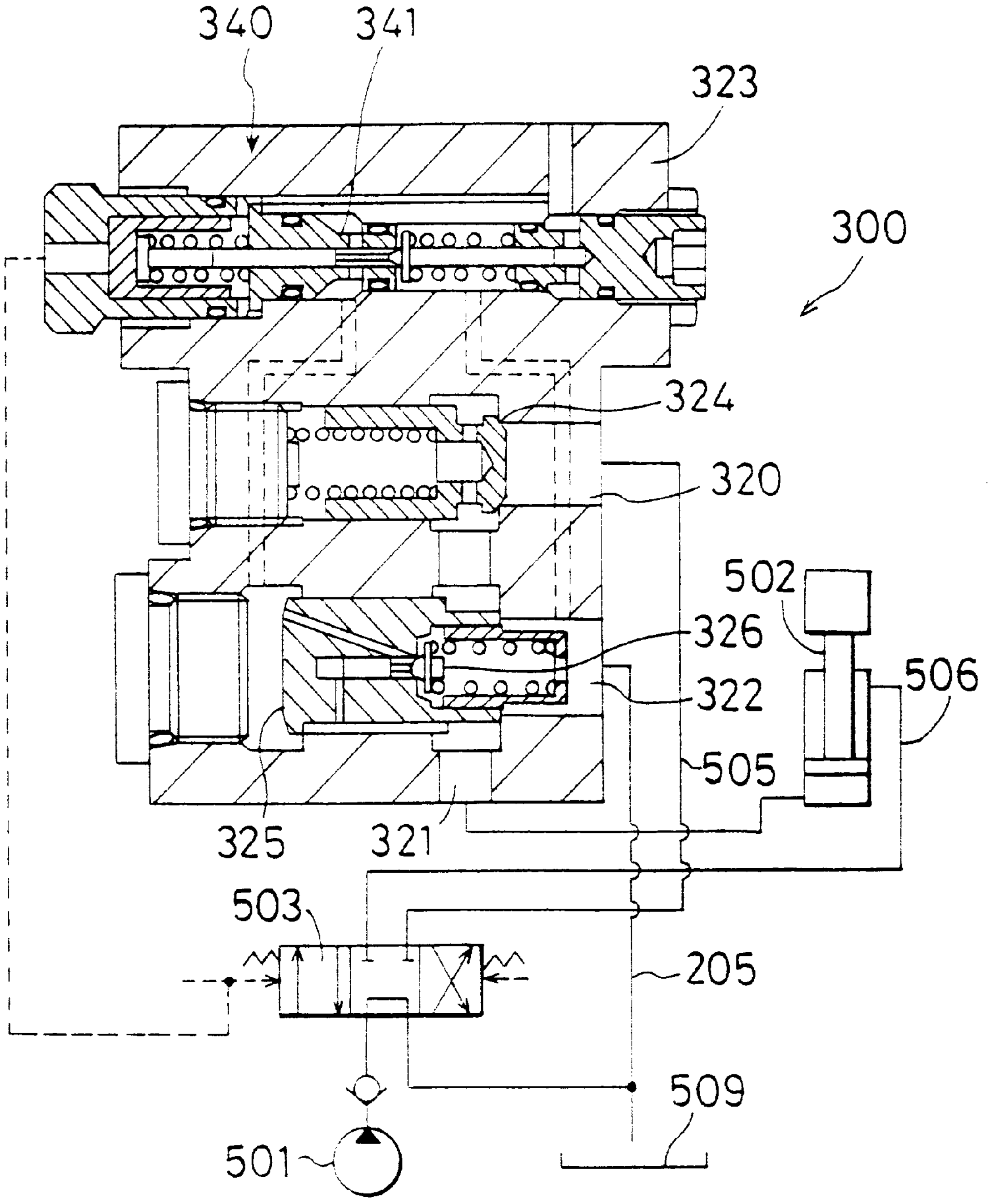
FIG. 10 PRIOR ART
FIG. 10 is a hydraulic circuit diagram showing another conventional hose rupture control valve unit, along with a hydraulic drive system in which the valve unit is disposed.

Another embodiment of the present invention will be described with reference to FIGS. 6 and 7. In FIGS. 6 and 7, equivalent members to those in FIGS. 1 to 3 are denoted by the same numerals.

Referring to FIGS. 6 and 7, a hose rupture control valve unit 100A of this embodiment includes a small relief valve 7A in place of the small spool 7 shown in FIG. 7, and a throttle 34 serving as pressure generating means which is disposed in a drain passage 15*d* of the small relief valve 7A. Also, in addition to the pressure bearing chamber 17 to which the pilot pressure (external signal) is introduced, a spool valve body 6A has another pressure bearing chamber 35 provided on the same side as the pressure bearing chamber 17 in series. The upstream side of the throttle 34 is connected to the pressure bearing chamber 35 via a signal passage 36 so that a pressure generated by the throttle 34 act, as a driving force, on the spool valve body 6A on the same side as the pilot pressure (external signal).

In the event an excessive external force acts on the hydraulic cylinder 102 and the pressure in the back pressure chamber 10 rises, the small relief valve 7A is opened, causing the hydraulic fluid to flow into the pilot passage 15*d* in which the throttle 34 is disposed. As a result, the pressure in the signal passage 36 rises to move the spool valve body 6A, whereupon the pilot variable throttle 6*a* is opened, allowing the hydraulic fluid to flow into the pilot passages 15*a*, 15*b*. The poppet valve body 5 is also thereby opened. In this way, similarly to the above embodiment, the hydraulic fluid in the hydraulic cylinder 102 can be released to the reservoir through the main overload relief valve 107*a*.

With this embodiment thus constructed, the same functions as those of the embodiment shown in FIG. 1 can be realized by using the small relief valve 7A through which the hydraulic fluid passes at a smaller flow rate than that in the embodiment shown in FIG. 1. Hence the component size can be reduced and the overall size of the valve unit can be further reduced.

According to the present invention, as described above, just by providing a poppet valve body in a flow passage through which all of a hydraulic fluid supplied to and discharged from a hydraulic cylinder passes, the poppet valve body can fulfill the various functions needed for a hose rupture control valve unit. Therefore, a valve unit having a small pressure loss can be constructed, and highly efficient operation can be achieved with a less energy loss. Also, since the hose rupture control valve unit of the present invention has a smaller size than the conventional one, a possibility that the valve unit may be damaged during working is reduced, and a degree of flexibility in design is increased. Further, the reduced number of components contributes to reducing the failure frequency, improving the reliability, and enabling the valve unit to be produced at a relatively low cost.

Moreover, according to the present invention, since the hydraulic fluid, that is brought into a high-pressure level under action of an external force, can be released to a reservoir through a main overload relief valve upon the poppet valve body being opened, a drain hose specific to the overload relief valve is no longer required in the valve unit, and routing of the hose around the valve unit can be simplified.

According to the present invention, the hydraulic fluid at a high pressure can be released through the main overload relief valve while the poppet valve body is opened just by causing the hydraulic fluid to flow through a relief valve provided in the hose rupture control valve unit at a small flow rate. Therefore, the component size can be reduced and the overall size of the valve unit can be further reduced.

According to the present invention, even with two hose rupture control valve units arranged in parallel as encountered when attached to boom cylinders, metering characteristics of the two valve units can be adjusted with good accuracy because a dead zone is set for the poppet valve body and only a spool valve body is operated when the poppet valve body is in the dead zone.

Additionally, according to the present invention, the accuracy of metering characteristic of the spool valve body itself can be further improved by adjusting the stiffness of a spring associated with the spool valve body.

What is claimed is:

1. A hose rupture control valve unit which is provided between a supply/drain port of a hydraulic cylinder and a hydraulic hose connected to one of two actuator ports of a control valve for supplying a hydraulic fluid to and draining a hydraulic fluid from said hydraulic cylinder, and to which an external signal corresponding to a command signal for driving said control valve is given for controlling a flow rate of a hydraulic fluid coming out from said supply/drain port to said hydraulic hose in accordance with said external signal, said valve unit comprising:

a poppet valve body serving as a main valve slidably disposed in a housing provided with a cylinder connecting chamber connected to said supply/drain port, a hose connecting chamber connected to said hydraulic hose, and a back pressure chamber, said poppet valve body being able to selectively interrupt and establish communication between said cylinder connecting chamber and said hose connecting chamber, and changing an opening area depending on the amount of movement thereof, and a spool valve body serving as a pilot valve disposed in a pilot passage connecting said back pressure chamber and said hose connecting chamber, and operated in accordance with said external signal to interrupt and control a rate of pilot flow passing through said pilot passage depending on the amount of movement thereof, said poppet valve body being provided with a feedback variable throttle passage which has an initial opening area when said poppet valve body is in an interrupting position, and which increases an opening area thereof depending on the amount of movement of said poppet valve body, thereby controlling a value of said rate of pilot flow coming out from the cylinder connecting chamber to the back pressure, said poppet valve body having a dead zone set to maintain said poppet valve body in the interrupting position when said rate of pilot flow is not larger than a predetermined value upon actuation of said spool valve body by said external signal, said spool valve body being configured to provide a metering characteristic for controlling said rate of pilot flow depending on said external signal when the pilot flow rate is not larger than said predetermined value.

2. A hose rupture control valve unit according to claim 1, further comprising communicating means for communicating said back pressure chamber with a reservoir when a pressure in said hose connecting chamber exceeds a preset value.

3. A hose rupture control valve unit according to claim 2, wherein said communicating means is provided in parallel to said spool valve body.

4. A hose rupture control valve unit according to claim 2, wherein said communicating means comprises a relief valve provided in parallel to said spool valve body, pressure generating means provided downstream of said relief valve, and means for causing a pressure generated by said pressure generating means to act as a driving force on said spool valve body on the same side as said external signal.

5. A hose rupture control valve unit according to claim 1, wherein said poppet valve body has a dead zone set to maintain said poppet valve body in the interrupting position when said rate of pilot flow is not larger than a predetermined value.

6. A hose rupture control valve unit according to claim 1, wherein said spool valve body includes adjusting means capable of changing the amount of movement of said spool valve body with respect to said external signal.

* * * * *